(12) United States Patent
Yamada et al.

(10) Patent No.: US 12,090,690 B2
(45) Date of Patent: Sep. 17, 2024

(54) FOAMED PRODUCT, METHOD FOR MANUFACTURING FOAMED PRODUCT

(71) Applicant: MIMAKI ENGINEERING CO., LTD., Nagano (JP)

(72) Inventors: Yoshimi Yamada, Nagano (JP); Isao Kurashima, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 410 days.

(21) Appl. No.: 17/429,347

(22) PCT Filed: Feb. 10, 2020

(86) PCT No.: PCT/JP2020/005059
§ 371 (c)(1),
(2) Date: Aug. 8, 2021

(87) PCT Pub. No.: WO2020/175120
PCT Pub. Date: Sep. 3, 2020

(65) Prior Publication Data
US 2022/0105665 A1    Apr. 7, 2022

(30) Foreign Application Priority Data

Feb. 28, 2019 (JP) .................................. 2019-036784
Feb. 28, 2019 (JP) .................................. 2019-037055

(51) Int. Cl.
B29C 44/56    (2006.01)
B29C 44/02    (2006.01)
(Continued)

(52) U.S. Cl.
CPC .............. *B29C 44/56* (2013.01); *B29C 44/02* (2013.01); *B29C 44/3415* (2013.01); *B32B 3/30* (2013.01);
(Continued)

(58) Field of Classification Search
CPC ..... B29C 44/02; B29C 44/56; B29C 44/3415; B32B 3/30; B32B 5/18; B32B 33/00;
(Continued)

(56) References Cited

FOREIGN PATENT DOCUMENTS

| JP | S5569425 | 5/1980 |
|----|----------|--------|
| JP | H0326545 | 2/1991 |

(Continued)

OTHER PUBLICATIONS

Translation of JPH0326545A. (Year: 1991).*

(Continued)

Primary Examiner — Catherine A. Simone
(74) Attorney, Agent, or Firm — JCIPRNET

(57) ABSTRACT

Provided are a foamed product with a high level of design, and the like. The problem is solved by a foamed product including: a foam medium with a first part protruded by foaming and a second part that is lower than the first part; and a decorative part with a plurality of decorative particles, formed only in the second part of the first part and the second part, and a manufacturing method for a foamed product, including: a first step of foaming a foam medium to form, in the foam medium, a first part protruded by the foaming and a second part that is lower than the first part; and a second step of fixing a plurality of decorative particles only to the second part of the first part and the second part.

9 Claims, 7 Drawing Sheets

(51) Int. Cl.
*B29C 44/34* (2006.01)
*B29K 101/12* (2006.01)
*B32B 3/30* (2006.01)
*B32B 5/18* (2006.01)
*B32B 33/00* (2006.01)
*B41M 5/00* (2006.01)

(52) U.S. Cl.
CPC ............... *B32B 5/18* (2013.01); *B32B 33/00* (2013.01); *B41M 5/0047* (2013.01); *B41M 5/0064* (2013.01); *B29K 2101/12* (2013.01)

(58) Field of Classification Search
CPC .......... B32B 5/22; B32B 5/30; B41M 5/0047; B41M 5/0064; B29K 2101/12
USPC .................. 428/158, 159, 201, 206, 207
See application file for complete search history.

(56) References Cited

FOREIGN PATENT DOCUMENTS

| | | |
|---|---|---|
| JP | H03178373 | 8/1991 |
| JP | H07266528 | 10/1995 |
| JP | H07329093 | 12/1995 |
| JP | H10156855 | 6/1998 |
| JP | 2000211049 A * | 8/2000 |
| JP | 2019006563 | 1/2019 |

OTHER PUBLICATIONS

Translation of JP2000211049A. (Year: 2000).*
"International Search Report (Form PCT/ISA/210) of PCT/JP2020/005059", mailed on Apr. 21, 2020, with English translation thereof, pp. 1-6.

* cited by examiner

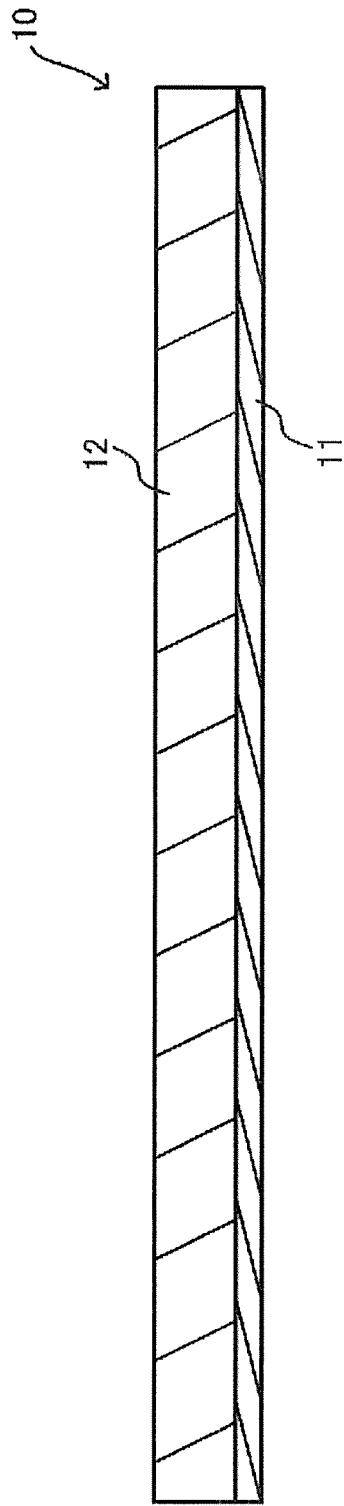
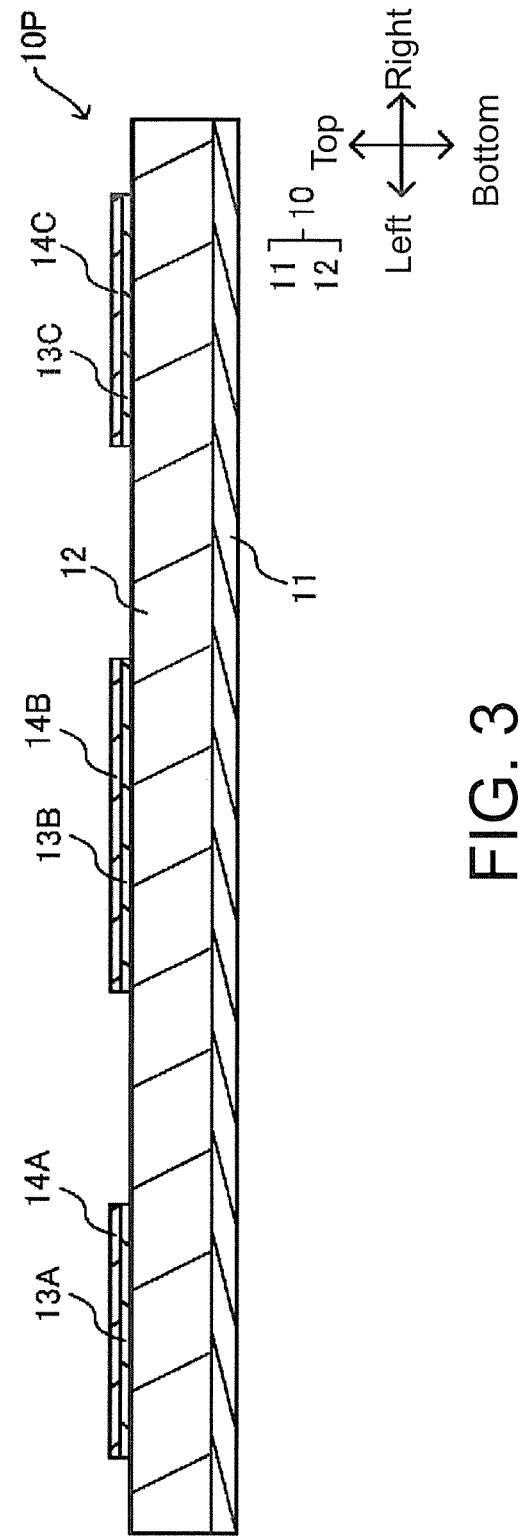

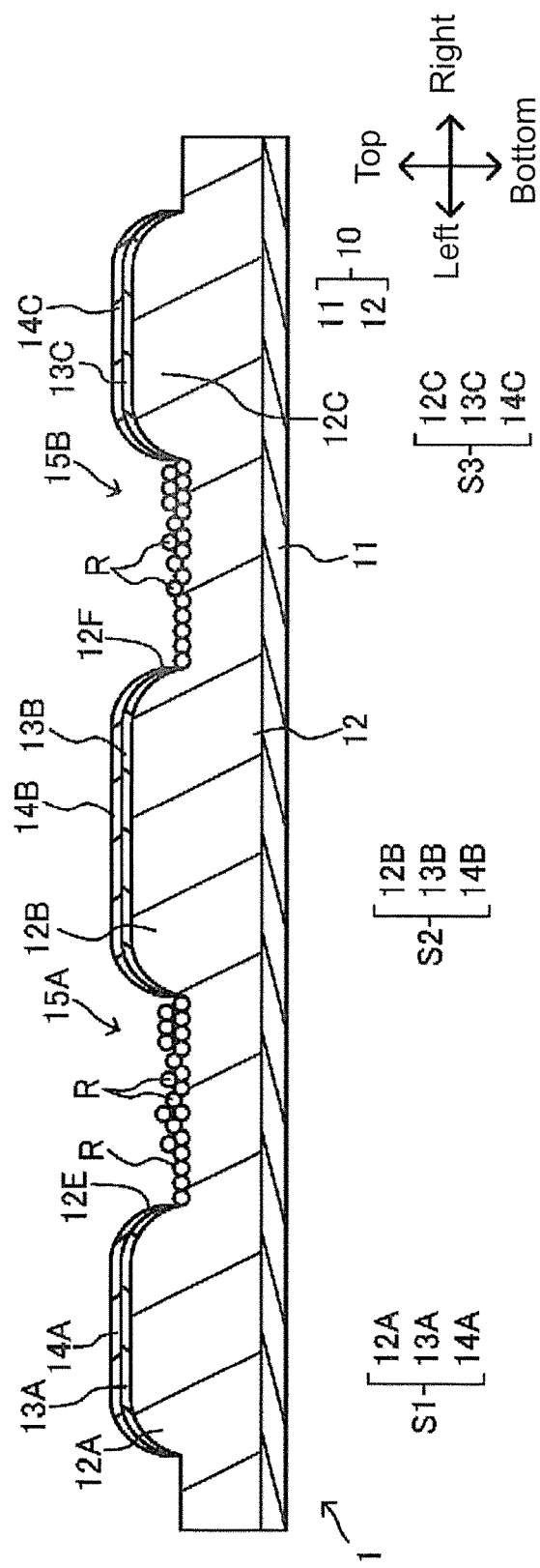
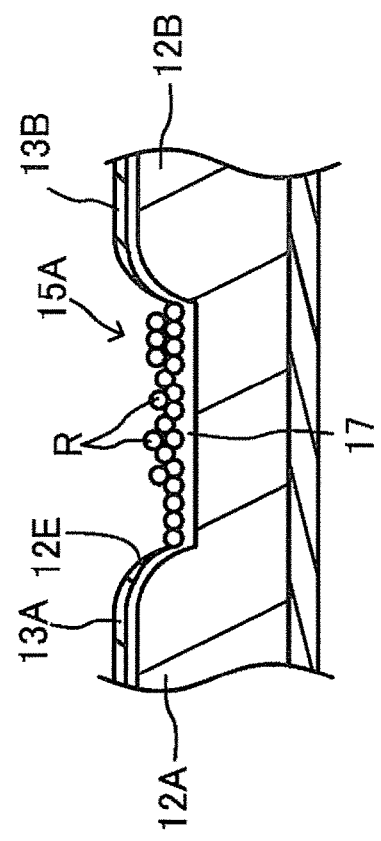

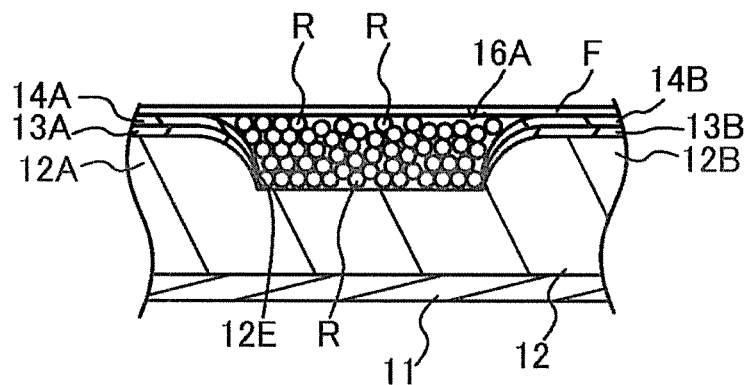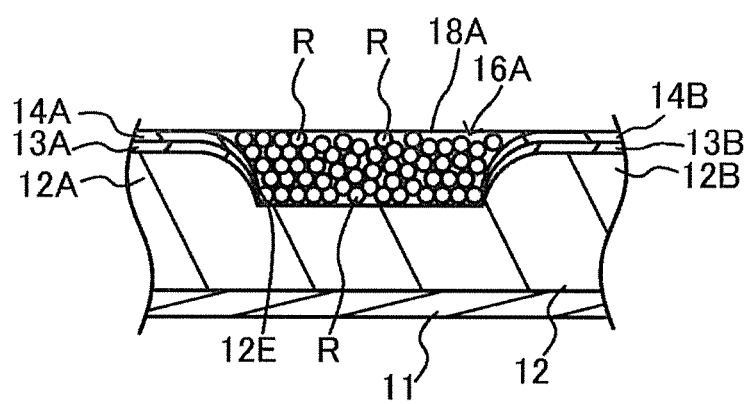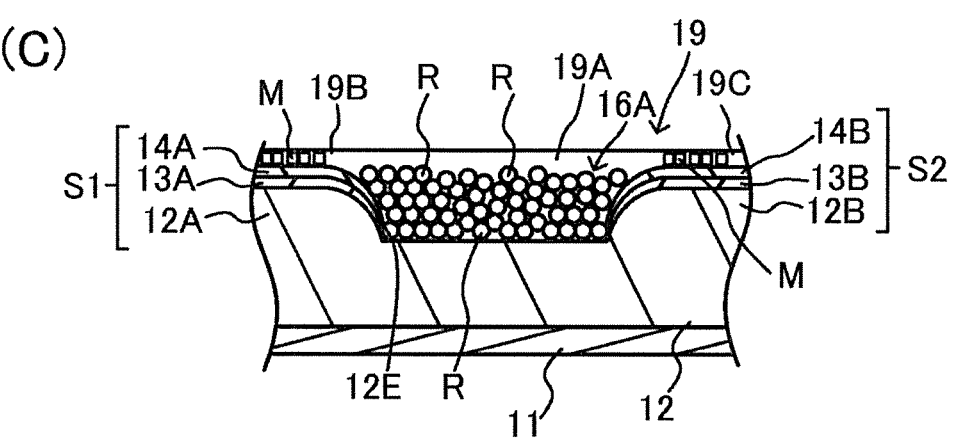
FIG. 10

(a)
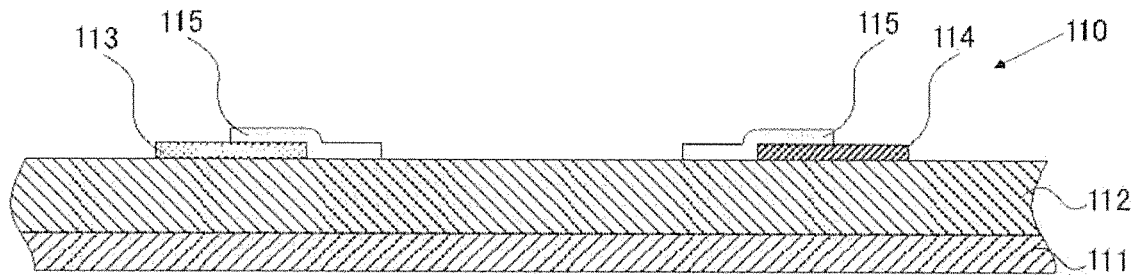
(b)
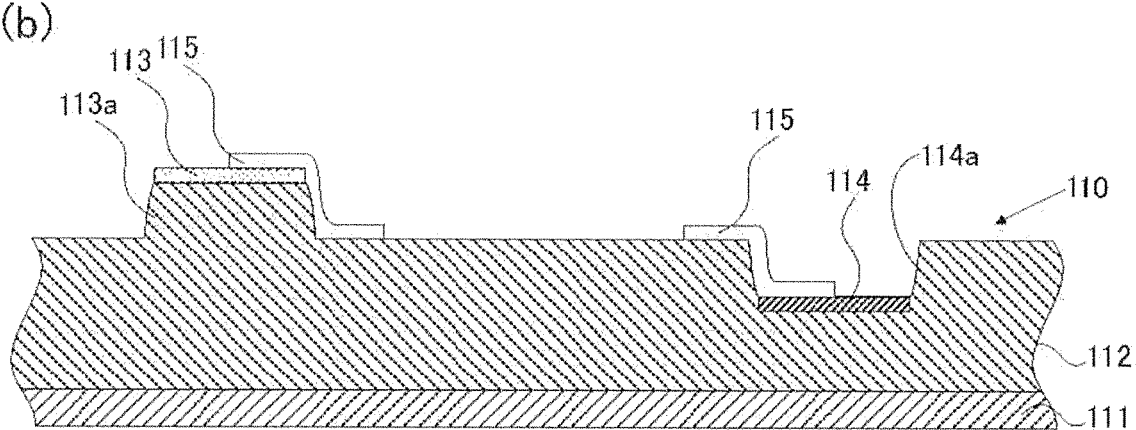
FIG. 11
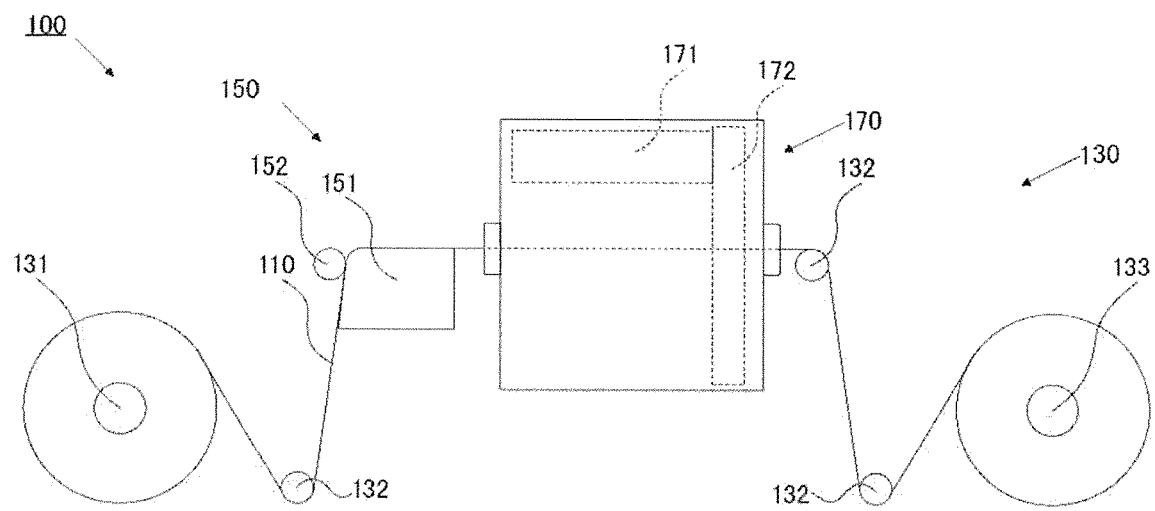
FIG. 12

FOAMED PRODUCT, METHOD FOR MANUFACTURING FOAMED PRODUCT

CROSS-REFERENCE TO RELATED APPLICATION

This application is a 371 application of the international PCT application serial no. PCT/JP2020/005059, filed on Feb. 10, 2020, which claims the priority benefits of Japan application no. 2019-036784, filed on Feb. 28, 2019, and Japan application no. 2019-037055, filed on Feb. 28, 2019. The entirety of each of the above-mentioned patent applications is hereby incorporated by reference herein and made a part of this specification.

TECHNICAL FIELD

The present invention relates to a foamed product, a manufacturing method for a foamed product, and a foaming apparatus.

BACKGROUND ART

Conventionally, foamed products (wall paper and the like) with irregularities formed by foaming are known. As a manufacturing method for the foamed products, Patent Literature 1 discloses a foamed product in which a decorative part (fine-particle outermost layer 4) with beads, sand, fine-particle crushed stones, and the like is formed over the entire surface of a foam medium (base material 1, base print layer 2, and foamable ink layer 3) with irregularities.

Various foaming apparatuses for heating and then foaming foamable media have been developed.

For example, Japanese Patent Application No. 2019-6563 discloses a foaming apparatus that heats, with an infrared heater, a foamable medium on which an image or a functional ink for adjusting the degree of foaming is printed, while conveying the foamable medium by a roll-to-roll method, for manufacturing a foam with a desired image and irregularity pattern.

CITATION LIST

Patent Literature

Patent Literature 1: Japanese Unexamined Patent Publication No. H7-266528A.

SUMMARY OF INVENTION

Technical Problems

In Patent Literature 1 mentioned above, the decorative part is formed over the entire surface of the foam medium, and the appearance is thus monotonous with a poor level of design.

The present invention has been made to solve such problems as mentioned above, and provides a foamed product with a high level of design, and a manufacturing method for a foamed product with a high level of design.

In such a foaming apparatus as described above, the foaming time taken to foam the foamable medium is preferably short (in particular, the furnace length of the heating region for foaming is preferably short, and the conveyance speed of the foamable medium is preferably high). As a method for shortening the foaming time, it is conceivable to increase the heating temperature (the output of the infrared heater herein) of the foaming apparatus, but the increased heating temperature makes the foamable medium likely to be damaged by heat. Thus, there is a need to sufficiently shorten the foaming time, but if the foaming time is excessively short, then insufficient foaming can be obtained. As described above, the increased heating temperature makes it difficult to adjust the foaming time (in particular, the adjustment of the furnace length of the heating region for foaming and the adjustment of the conveyance speed of the foamable medium). Accordingly, it is difficult to employ a method of increasing the heating temperature to shorten the foaming time.

In view of the foregoing, the present invention provides a foaming apparatus in which the foaming time is short while the heating temperature for foaming is not high.

Solutions to Problems

For achieving the solutions mentioned above, a foamed product according to a first aspect of the present invention includes: a foam medium, having a first part protruded by foaming, and a second part being lower than the first part; and a decorative part, having a plurality of decorative particles, and being formed only in the second part of the first part and the second part.

The first part may be a foamed part, and the second part may be a part that is lower in the degree of foaming (including non-foaming) than the first part and thus lower (thinner) than the second part. The second part is, for example, a non-foamed region of the foam layer.

In accordance with the configuration mentioned above, no decorative part is formed on the first part, whereas the decorative part is formed in the second part, thus making the appearance of the foamed product less monotonous as compared with a case where the decorative part is formed over the entire surface of the foam medium, and achieving a high level of design.

The plurality of decorative particles may be 0.01 mm or more in length.

In accordance with the configuration mentioned above, a high level of design is achieved.

The plurality of decorative particles each have a size that is visually recognizable with naked eyes.

In accordance with the configuration mentioned above, a higher level of design is achieved by the decorative particles.

The foam medium may have an image printed thereon.

In accordance with the configuration mentioned above, a higher level of design is achieved by the image and the decorative part.

The foam medium may include: a foamed part, including the first part; and a less foamed part, including the second part, and the less foamed part being less foamed than the foamed part, and the decorative part may be formed only in at least a part of the less foamed part of the foamed part and the less foamed part.

In accordance with the configuration mentioned above, the decorative part is provided only in the less foamed part, and a higher level of design is achieved.

The second part may be a recess, and the recess may be filled with the plurality of decorative particles.

In accordance with the configuration mentioned above, a new appearance can be provided by the plurality of decorative particles filling the recess, and a higher level of design is achieved.

The foam medium may have a thermoplastic resin layer constituting a foam layer or an ink receiving layer, and the plurality of decorative particles may be fused to the thermoplastic resin layer.

In accordance with the configuration mentioned above, the need for an adhesive or the like for fixing the decorative particles can be eliminated.

The foamed product may further include: a transparent layer, formed over the first part and the second part, and fixed to the first part and the second part, and the plurality of decorative particles may be disposed in a part of the transparent layer corresponding to the second part.

In accordance with the configuration mentioned above, the large bonded part of the transparent layer can prevent disadvantages such as peeling of the transparent layer from the foam medium.

For achieving the solutions mentioned above, a manufacturing method for a foamed product according to a second aspect of the present invention is: a manufacturing method for a foamed product, including: a first step of foaming a foam medium to form, in the foam medium, a first part protruded by the foaming and a second part that is lower than the first part; and a second step of fixing a plurality of decorative particles only to the second part of the first part and the second part.

In accordance with the configuration mentioned above, a foamed product with a high level of design can be manufactured.

The first part and the second part may be adjacent to each other, and the second step may include: a step 2-1 of supplying a plurality of decorative particles to at least the second part of the foam medium; and a step 2-2 of scraping off, among the plurality of decorative particles supplied in the step 2-1, the decorative particles remaining on the first part of the foam medium to the second part.

In accordance with the configuration mentioned above, even if the decorative particles fail to be supplied only to the second part, the decorative particles on the first part can be removed.

A foaming apparatus for a foamable medium according to the first aspect of the present invention includes: a first heater that heats a foamable medium including a foam layer that is foamed by heating at a heating temperature that is equal to or higher than a foaming temperature, conveyed in a predetermined conveyance direction, at a first temperature that is lower than the foaming temperature; and a second heater that heats the foamable medium heated by the first heater, at a second temperature that is equal to or higher than the foaming temperature, to foam the foamable medium.

In accordance with the configuration mentioned above, the foamable medium can be foamed at a heating temperature that is not high and in a short foaming time.

The first temperature may be higher than a room temperature.

In accordance with the configuration mentioned above, the foamable medium can be foamed at a heating temperature that is not high and in a short foaming time.

The first heater may heat the foamable medium until reaching a predetermined temperature.

In accordance with the configuration mentioned above, the foamable medium can be foamed at a heating temperature that is not high and in a short foaming time.

The second heater may heat the foamable medium in accordance with a uniform heating temperature distribution in the conveyance direction.

In accordance with the configuration mentioned above, the foamable medium can be foamed at a heating temperature that is not high and in a short foaming time.

The first temperature may be lower than the melting temperature of a thermoplastic resin constituting the foam layer.

In accordance with the configuration mentioned above, the foamable medium can be foamed at a heating temperature that is not high and in a short foaming time. In addition, foaming unevenness of the foamable medium can be suppressed.

The first heater may include a contact-type heating device, and the second heater may include a non-contact-type heating device.

In accordance with the configuration mentioned above, the foamable medium can be foamed at a heating temperature that is not high and in a short foaming time. In addition, foaming unevenness of the foamable medium can be suppressed.

Effect of the Invention

The present invention can provide a foamed product with a high level of design and a manufacturing method for a foamed product with a high level of design.

The present invention can shorten the foaming time required for foaming the foamable medium, at the heating temperature for foaming the foamable medium, which is not high.

BRIEF DESCRIPTION OF THE DRAWINGS

FIG. 2 is a cross-sectional view of a foam medium.

FIG. 3 is a cross-sectional view of a foam medium with foaming control ink layers and color ink layers formed.

FIG. 8 is a cross-sectional view of a foamed product that is a foamed medium with decorative particles fixed.

FIG. 9 is a cross-sectional view of a foamed product according to a modified example.

In FIG. 10, (A) is a cross-sectional view of a foamed product according to a modified example; (B) is a cross-sectional view of a foamed product according to another modified example; (C) is a cross-sectional view of a foamed product according to another modified example.

FIG. 11 is a schematic cross-sectional view of a foamable medium, where (a) shows the foamable medium before foaming, and (b) shows the foamable medium after the foaming.

FIG. 12 is a schematic diagram of a foaming apparatus for a foamable medium according to the present embodiment.

DESCRIPTION OF EMBODIMENTS (Forming Method for Foamed Product 1)

A method for forming a foamed product 1 according to an embodiment of this invention will be described with reference to FIG. 1 to FIG. 8. As described later, the foamed product 1 has, at the surface thereof, irregularities due to foaming (FIG. 8 and the like). For the foamed product 1, images (color ink layers 14A to 14C) are printed over a plurality of protrusions 12A to 12C, and recesses 12E and 12F between the protrusions 12A to 12C are respectively provided with decorative parts 15A and 15B composed of a large number of decorative particles R. As described later, the decorative particles R are composed of thermoplastic resin particles such as resin beads, and the decorative parts 15A and 15B express a texture.

Figure 1:
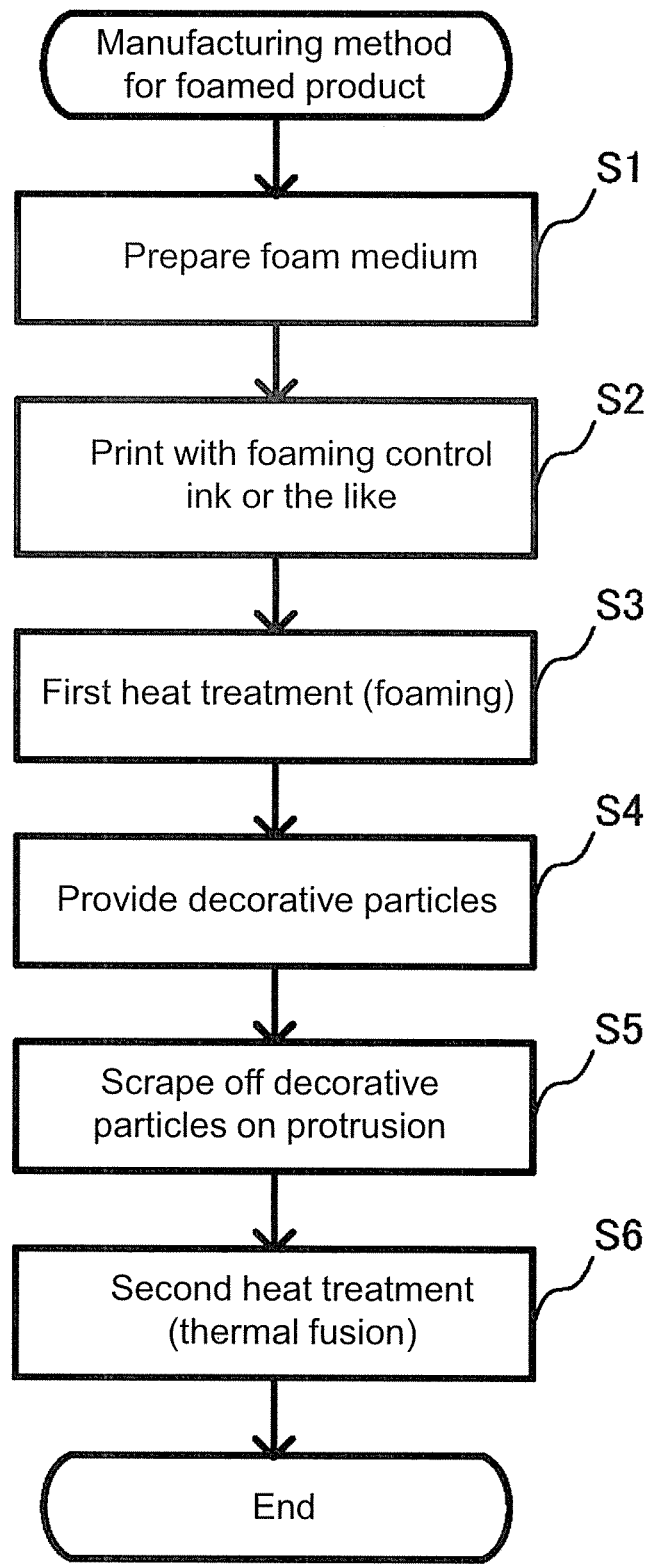
FIG. 1 is a flowchart of a manufacturing method for a foamed product according to an embodiment of the present invention.
Figure 4:
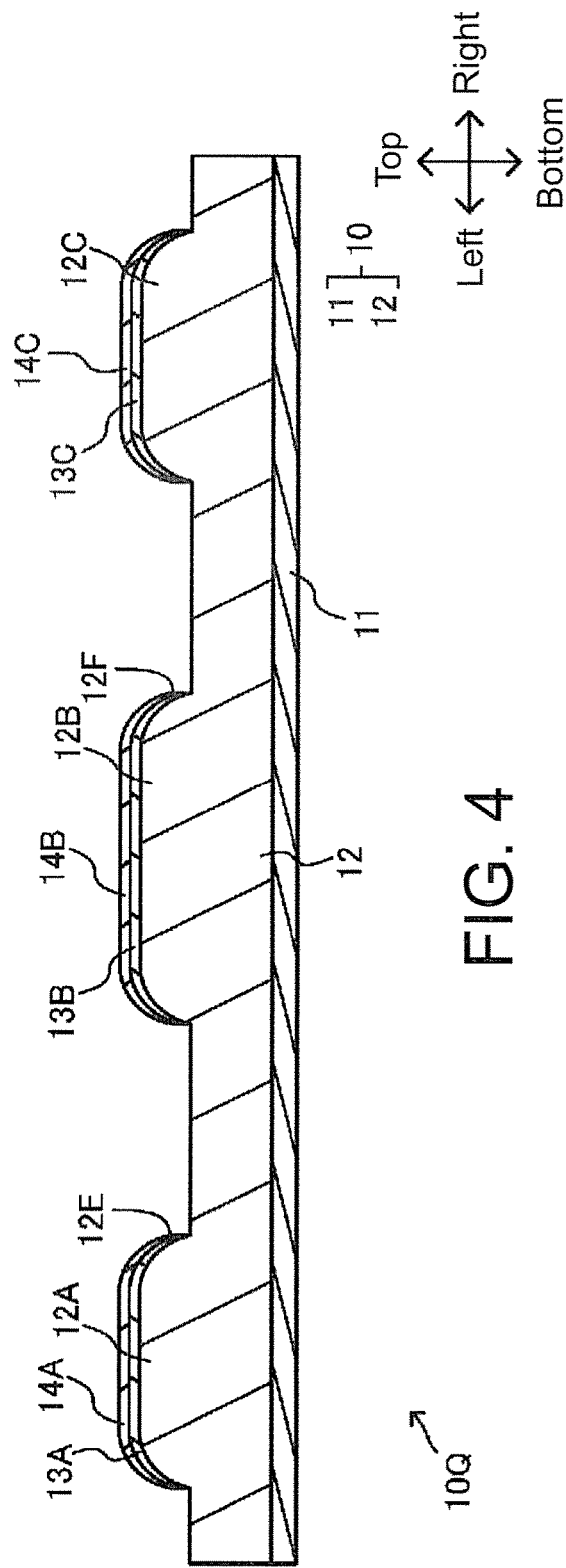
FIG. 4 is a cross-sectional view of a foamed medium after foaming.
Figure 5:
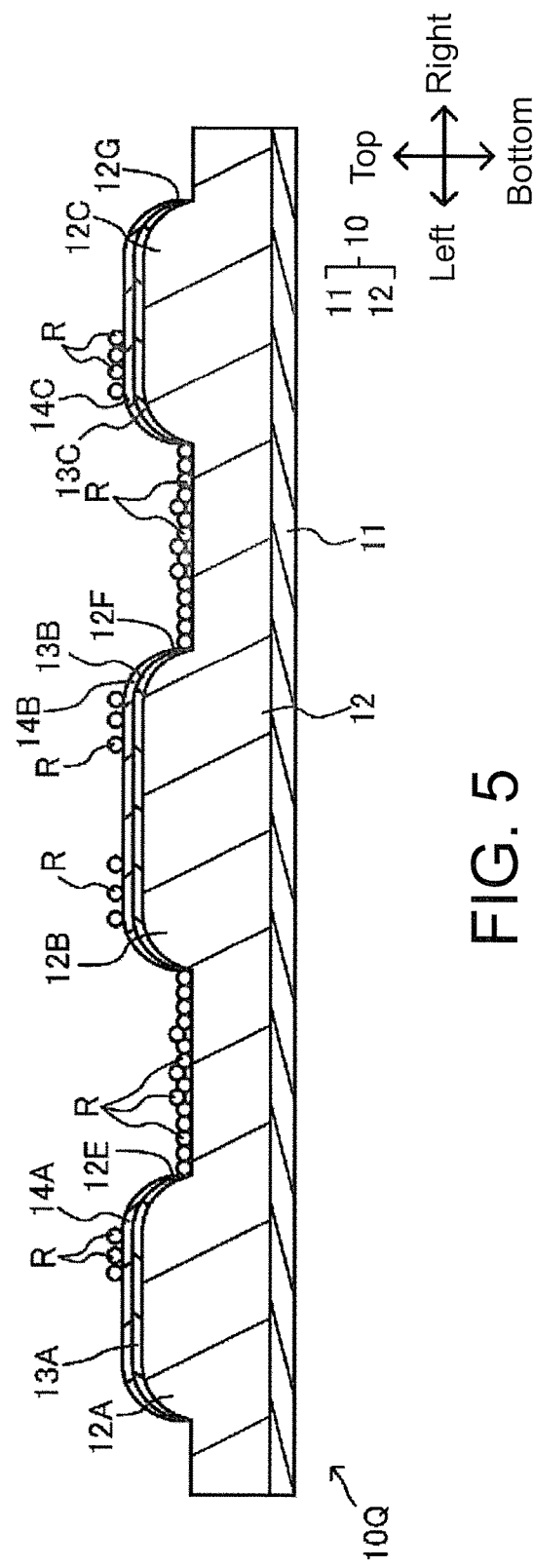
FIG. 5 is a cross-sectional view of a foamed medium with decorative particles provided.
Figure 6:
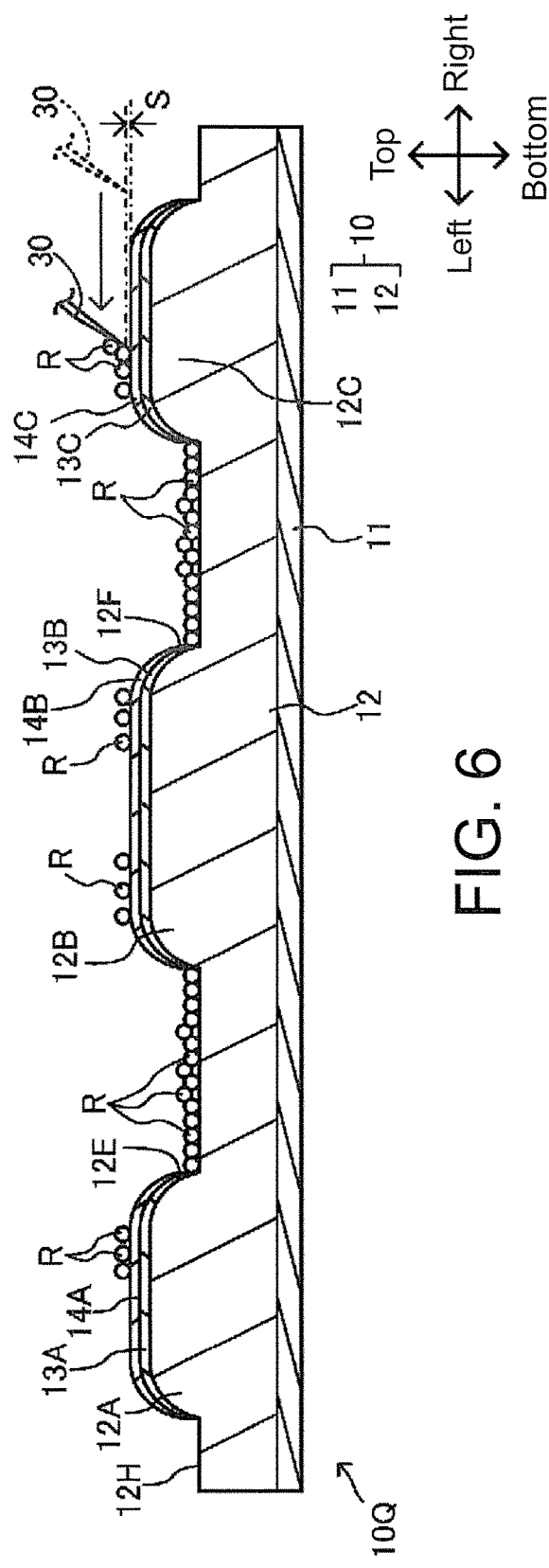
FIG. 6 is a cross-sectional view of a foam medium, illustrating a way of scraping off decorative particles.
Figure 7:
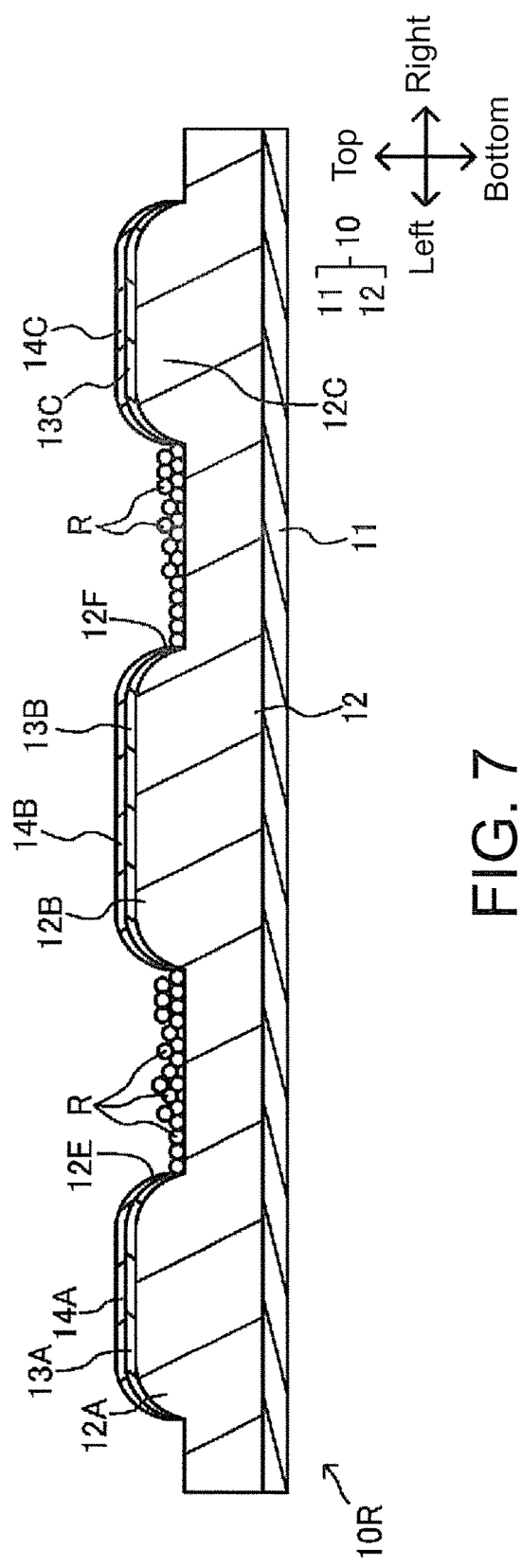
FIG. 7 is a cross-sectional view of a foam medium after scraping off the decorative particles.

As shown in FIG. 1, the method for forming the foamed product 1 includes steps S1 to S6. In the step S1, the foam medium 10 (FIG. 2 and the like) is prepared. In the step S2, the foam medium 10 prepared in step S1 is subjected to printing with a foaming control ink and a color ink is performed (FIG. 3). In the step S3, the foam medium 10 subjected to the printing in step S2 is foamed by a first heat treatment (FIG. 4). In the step S4, decorative particles R are provided to the foam medium 10 after the forming (FIG. 5). In the step S5, the unnecessary decorative particles R on protrusions formed by the foaming are scraped off among the decorative particles R provided in the step S4 (FIGS. 6 and 7). In the step S6, the foam medium 10 after the step S5 is subjected to a second heat treatment to thermally fuse and then fix the decorative particles R made of a thermoplastic resin to the foam medium 10. The fixing results in the formation of the decorative parts 15A and 15B, thereby completing the foamed product 1 (FIG. 8). Each step will be described in detail below.

(Step S1)

In the step S1, the foam medium 10 is prepared. As shown in FIG. 2, the foam medium 10, which is a sheet-like medium with a flat surface, includes a layered base material 11 and a foam layer 12.

The base material 11 supports the foam layer 12. Examples of the base material 11 include a paper sheet, a nonwoven fabric sheet, and a plastic film. The thickness of the base material 11 may be, for example, 0.025 mm to 0.3 mm, more preferably 0.05 mm to 0.12 mm.

The foam layer 12 is a layer that foams when heated. This foaming causes the surface of the foam layer 12 to protrude. The foam layer 12 includes a thermoplastic resin as a base and thermally expandable microcapsules dispersed in the thermoplastic resin. The thermally expandable microcapsule includes a microcapsule made of a thermoplastic resin and a volatile solvent (liquid hydrocarbon or the like) enclosed in the microcapsule.

When the foam layer 12 is heated, the thermally expandable microcapsules are heated. This heating softens the microcapsules and volatilizes the volatile solvent, thereby causing the thermally expandable microcapsules foam and expand. The expanded thermally expandable microcapsules maintain their sizes when subsequently cooled. The temperature at which the thermally expandable microcapsules start to foam is also referred to as a foaming start temperature. Materials for the thermoplastic resin and the thermally expandable microcapsules are selected such that the foaming start temperature is higher than the glass transition temperature of the thermoplastic resin of the foam layer 12.

When the temperature of the foam layer 12 rises to the foaming start temperature, the thermoplastic resin as a base softens, and the thermally expandable microcapsules foam and then expand. Thus, the part provided with the expanded thermally expandable microcapsules protrudes. The foaming of the thermally expandable microcapsules is also referred to as the foaming of the foam layer 12 containing the thermally expandable microcapsules. The surface of the foam layer 12 protrudes due to the foaming.

(Step S2)

In the step S2, the foaming control ink layers 13A to 13C shown in FIG. 3 are printed on the surface of the foam medium 10 with the foaming control ink, and the color ink layers 14A to 14C shown in FIG. 3 are printed with the color ink.

The foaming control ink is an ink for controlling the foaming site of the foam layer 12 (controlling which part is foamed). The foaming control ink herein is an ink for foaming the foam layer 12, and is applied to a region of the foam layer 12 desired to be foamed. The foaming control ink is an ink containing a near-infrared absorbing dye, and carbon black is used herein as the near-infrared absorbing dye. The foaming control ink applied to the foam medium 10 is dried and thereby fixed to the foam medium 10 as the foaming control ink layers 13A to 13C (layers containing carbon black herein).

The color ink, which is intended to print images, contains a solvent and a dye or pigment dissolved or dispersed in the solvent. The color ink is applied to a site of the foam medium 10 on which an image is to be printed. The color ink herein is to be applied on the foaming control ink layers 13A to 13C. The color ink applied to the foam medium 10 is dried and thereby fixed as the color ink layers 14A to 14C on the foam medium 10. The color ink layers 14A to 14C represent images. Accordingly, the formation of the color ink layers 14A to 14C is also referred as printing images. In the case of using a colored dye such as carbon black for the foaming control ink, a white ink layer (white layer) is preferably formed with a white color ink as the lowermost layer (base layer) of each of the color ink layers 14A to 14C or between each of the color ink layers 14A to 14C and each of the color ink layers 14A to 14C. Thus, the color development of the color ink layers 14A to 14C can be improved.

The foaming control ink and the color ink are applied to the foam medium 10 by an inkjet printer or the like. The foam medium 10 after the foaming control ink layers 13A to 13C and the color ink layers 14A to 14C are printed in the step S2 is hereinafter also referred to as a foam medium 10P.

(Step S3)

In the step S3, the first heating treatment of heating the foam medium 10 is performed for foaming the foam medium 10. In the first heat treatment, the foam medium 10P is irradiated with electromagnetic waves (near infrared rays). The foaming control ink layers 13A to 13C absorb the electromagnetic waves with which the layers are irradiated, and generate heat. The heat generation utilizes the phenomenon of the electromagnetic waves absorbed by carbon molecules with a covalent molecular structure. The foaming control ink layers 13A to 13C generate heat to heat and foam regions of the foam layer 12 where the foaming control ink layers 13A to 13C are provided (regions immediately below each of the foaming control ink layers 13A to 13C). This foaming causes three parts provided with the respective foaming control ink layers 13A to 13C, of the surface of the foam medium 10P, to protrude, thereby forming the protrusions 12A to 12C as shown in FIG. 4. The recesses 12E and 12F are formed between the respective protrusions of the protrusions 12A to 12C. The foam medium 10P foamed by the step S3 is also referred to as a foam medium 10Q.

(Step S4)

In the step S4, a large number of decorative particles R are provided to the foam medium 10Q. The decorative particles R herein are resin beads made of a thermoplastic resin. The decorative particle R is formed in a spherical shape in FIG.

5 and the like, but is not limited to any spherical shape and may be formed in various shapes. The decorative particles R are provided by a dispenser, hand work, or the like. The decorative particles R are provided mainly to the recesses 12E and 12F, but it is difficult to provide the decorative particles R only to the recesses 12E and 12F (which is remarkable, in particular, in a case where the recesses 12E and 12F are small), and as shown in FIG. 5, some of the decorative particles R remain on the protrusions 12A to 12C, more specifically, on the color ink layers 14A to 14C.

The decorative particles R preferably have a size that provide a texture (particularly, irregularities) to the decorative parts 15A and 15B. As described above, the decorative parts 15A and 15B are made to look like particles (one particle is represented by one decorative particle R) by the decorative particles R, thereby allowing the design to be improved. Each one of the decorative particles R preferably has a size that is visually recognizable with the naked eye. The size of the decorative particle R (the height in the case of the decorative particle R being self-supported or fixed to the foam medium 10, the width of the decorative particle R being self-supported or fixed to the foam medium 10 (the largest or smallest length of the decorative particle R in the case of the decorative particle R in an elongated shape or the like), and the like) is preferably, for example, a size from 0.1 mm to less than the height of the protrusions 12A to 12C (that is, the height difference between the part provided with the decorative part 15A or 15B and another part that is adjacent to the part and higher than the part, for example, approximately 0.3 mm to 1 mm), which is visually recognizable with the naked eye.

(Step S5)

In the step S5, the decorative particles R remaining on the color ink layers 14A to 14C are scraped off. As shown in FIG. 6 herein, a tool 30 for scraping off the decorative particles R is moved from right to left along the color ink layers 14A to 14C to scrape off the decorative particles R. The tool 30 herein is a knife with a metallic blade, and moved at a position out of contact with the color ink layers 14A to 14C so as not to damage the color ink layers 14A to 14C. The tool 30 is moved at a position where the distance S between the tool 30 and the color ink layers 14A to 14C is smaller than the size (particle size or the like) of the decorative particles R. The distance S is made smaller than the size (particle size or the like) of the decorative particles R, thereby allowing the tool 30 to reliably scrape off the decorative particles R. The tool 30 (the blade part of the knife) is preferably grounded (earthed) so as not to generate static electricity. The tool 30 is driven and moved by a predetermined drive mechanism.

The decorative particles R on the color ink layer 14C are scraped off by the tool 30 into the recess 12F. The decorative particles R on the color ink layer 14B are scraped off by the tool 30 into the recess 12E. Such scraping off increases, as shown in FIG. 7, the decorative particles R in the recesses 12E and 12F more than before scraping off (FIG. 6). The decorative particles R on the color ink layer 14 are scraped off by the tool 30 to a region 12H of the foam layer 12. The decorative particles R scraped off to the region 12H roll over the region 12H, thereby falling to the left side of the foam medium 10Q. It is to be noted that in a case where the decorative particles R scraped off to the region 12H remain in the region 12H, the decorative particles R are preferably scraped off to the left side of the foam medium 10Q with a brush, by air blowing, or the like. The foam medium 10Q after scraping off the decorative particles R is also referred to as a foam medium 10R (FIG. 7).

(Step S6)

In the step S6, the second heating treatment for heating the foam medium 10R and thereby fixing the decorative particles R to the foam medium 10R is performed. The second heat treatment thermally fuses and then fixes the decorative particles R made of the thermoplastic resin to the foam medium 10R. In the second heating treatment, the foam medium 10R is heated from above in a non-contact manner, for example, by a heater or the like. Alternatively, in the second heat treatment, the entire foam medium 10R may be heated by an oven or the like.

The heating temperature in the case of heating the foam medium 10R in the second heating treatment is adjusted to a temperature that is lower than the foaming start temperature (for example, a temperature within the range of 150 to 200° C., or the like) of the foam layer 12 such that the foam layer 12 is not foamed. Furthermore, the heating temperature is adjusted to a temperature at which the respective thermoplastic resins constituting the decorative particles R and the foam layer 12 can be heated to a temperature at which the decorative particles R can be thermally fused to each other and at which the foam layer 12 can be thermally fused to the decorative particles R. The heating temperature is preferably a temperature that is equal to or higher than the glass transition points (depending on the type of thermoplastic resin, for example, a temperature within the range of 60 to 120° C.) of, and equal to or lower than the melting points (in particular, a temperature at which the decorative particles R and the foam layer 12 do not collapse in shape while ensuring thermal fusion) of the respective thermoplastic resins constituting the decorative particles R and the foam layer 12. The thermal fusion includes softening and bonding the foam layer 12 and the like at a temperature that is equal to or higher than the glass transition point and lower than the melting point. From another perspective, materials for the respective thermoplastic resins constituting the decorative particles R and the foam layer 12 are preferably materials that have a lower glass transition point than the foaming start temperature of the foam layer 12 and can be thermally fused by the heating temperature.

Examples of the thermoplastic resins constituting the decorative particles R and the foam layer 12 include polyvinyl chloride (which may be filled with a plasticizer to be softened), polyethylene terephthalate, an acrylic resin, a urethane resin, a polyolefin resin, a polyethylene-vinyl acetate copolymer, and an epoxy resin.

The second heat treatment softens the respective thermoplastic resins of the decorative particle R and foam layer 12, thermally fuses the decorative particles R to each other and the foam layer 12 (the bottom surfaces of the recesses 12E and 12F) and the decorative particles R, and fixes the decorative particles R as the decorative parts 15A and 15B to the foam layer 12 (the bottom surfaces of the recesses 12E and 12F). This fixing achieves the foamed product 1 shown in FIG. 8.

The decorative particle R may be deformed by thermal fusion to some extent, but for example, the materials for the foam layer 12 and the decorative particles R may be selected such that the temperature of the glass transition point of the thermoplastic resin constituting the decorative particles R is higher than the temperature of the glass transition point of the thermoplastic resin constituting the foam layer 12, and the temperature for the heating may be adjusted between the both glass transition temperatures. Thus, the decorative particles R can be thermally fused to the foam layer 12 while maintaining the shapes of the decorative particles R, in such a way that the decorative particles R are not softened, whereas the foam layer 12 is softened.

As shown in FIG. 8, the foamed product 1 includes: the foam medium 10 with protrusions S1 to S3 (the protrusion S1 composed of the protrusion 12A, the foaming control ink layer 13A, and the color ink layer 14A, the protrusion S2 composed of the protrusion 12B, the foaming control ink layer 13B, and the color ink layer 14B, and the protrusion S3 composed of the protrusion 12C, the foaming control ink layer 13C, and color ink layer 14C) formed by foaming and with images (color ink layers 14A to 14C) and the like printed; and the decorative parts 15A and 15B formed by the decorative particles R respectively in the recesses 12E and 12F (lower parts than the protrusions S1 to S3) between the respective protrusions of the protrusions S1 to S3, with a texture expressed by the decorative particles R.

(Effects)

The foamed product 1 includes: the foam medium 10 (the foam medium 10 after the second heat treatment) with the protrusions S1 to S3 of first parts protruded by foaming and the recesses 12E to 12F (particularly, the bottom surfaces) of second parts lower than the protrusions S1 to S3; and the decorative parts 15A to 15B with the plurality of decorative particles R, formed only in the recesses 12E to 12F among the protrusions S1 to S3 and the recesses 12E to 12F. Such a configuration makes the appearance of the foamed product 1 less monotonous as compared with a case where the decorative part is formed over the entire surface of the foam medium 10, and the foamed product 1 has a high level of design (highly designed property, good appearance, etc.). In particular, the decorative parts 15A and 15B are provided in accordance with the shapes of the recesses 12E to 12F, thus achieving a high level of design. Furthermore, the first parts (protrusions S1 to S3) are decorated with the images or the like, but not decorated with decorative particles (particles that are visually recognizable with the naked eye), thus resulting in a new appearance and a high level of design.

Furthermore, in the configuration mentioned above, the decorative parts 15A and 15B are provided only in the recesses 12E to 12F, the decorative parts 15A and 15B are smaller in height (thickness) than the protrusions S1 to S3 that define the recesses 12E to 12F, and the upper ends of the decorative parts 15A and 15B are not protruded from the recesses 12E to 12F. Accordingly, even if the foamed product 1 comes into contact with another object (for example, even if abrasion is cause), the decorative particles R in the recesses 12E to 12F do not come into contact with the other object due to the presence of the protrusions S1 to S3, thus preventing the particles from falling off (abrasion resistance is achieved for the decorative parts 15A and 15B). Such an effect can be achieved, in particular, in the case of using the foamed product 1 or the structure mentioned above for decorating a portable article such as a smartphone case (details will be described later).

The foam medium 10 has images printed by the color ink layers 14A to 14C, and the foamed product 1 has a high level of design because of the images and the decorative parts 15A and 15B.

Furthermore, as mentioned above, none of the protrusions (protrusions S1 to S3) as foamed parts is provided with the decoration parts by the decorative particle R, whereas the recesses 12E and 12F as non-foamed parts only are provided with the decorative parts (decorative parts 15A and 15B) by the decorative particle R, and the foamed product 1 thus has a new appearance and a high level of design.

The decorative particles R are thermally fused to the foam layer 12, thus making it possible to eliminate the need for an adhesive material or the like for fixing the decorative particles.

As mentioned above, the decorative parts 15A and 15B are formed after foaming the foam layer 12, the decorative particles R before fixing are thus unlikely to move from the parts (the recess 12E or 12F) where the decorative parts 15A and 15B are desired to be provided (because the movement is blocked by the protrusions 12A to 12C), and the foamed product 1 can be easily manufactured.

As mentioned above, the decorative particles R remaining on the color ink layers 14A to 14C are scraped off with the tool 30 for scraping, and thus, the decorative particles R may fail to be supplied only into the recesses 12E and 12F, which facilitates the manufacture of the foamed product 1.

Furthermore, as mentioned above, the tool 30 is kept from coming into contact with the protrusions S1 to S3 (color ink layers 14A to 14C), thereby allowing the color ink layers 14A to 14C to be prevented from being damaged. Furthermore, the tool 30 may be a brush, a brush, a spatula, or the like. As with the knife mentioned above, the tool 30 is formed to be metallic and grounded, thereby allowing generation of static electricity to be prevented. The scraping mentioned above may be manually performed with the tool 30.

MODIFIED EXAMPLES

The present invention is not limited to the embodiment mentioned, and various modifications and applications can be made. Modified examples will be described below.

Modified Example 1

The foaming control ink may be, in addition to carbon black, an ink containing an absorbent that absorbs an electromagnetic wave with a predetermined wavelength (an electromagnetic wave that does not heat the whole foam layer 12) or the like to generate heat. In this case, in the first heating treatment, the foam medium 10P is irradiated with the electromagnetic wave with the predetermined wavelength. The foaming control ink layers 13A to 13C may be provided on the back surface. In this case, the irradiation with the electromagnetic wave or the like is performed from below.

The foaming control ink may be a foaming inhibition ink that inhibits foaming. In this case, for example, the foam medium 10P is entirely heated by an oven or the like, or the foam medium 10P is entirely heated from above. The foaming inhibition ink is applied (printed) to a region that is not desired to be foamed (in the foregoing, the recesses 12E and 12F) by an inkjet printer or the like. The foaming inhibition ink in this case contains, for example, a material (for example, a high-boiling-point solvent) that does not raise the temperature of the part of the foam layer 12 provided with the foaming inhibition ink in a case where the foam medium 10P is entirely heated. Alternatively, the foaming inhibition ink contains, for example, a material that penetrates into the foam layer 12 to dissolve the thermally expandable microcapsules or make the microcapsules brittle. Examples of these materials include epsilon caprolactone, gamma butyrolactone, and 2-pyrrolidone. The foaming inhibition ink is, in the foregoing, to be applied to the recesses 12E and 12F where the decorative parts 15A and 15B are formed. When the foaming inhibition ink does not penetrate into the foam layer, the decorative particles R will be disposed on the layer of the foaming inhibition ink. In this case, because of the decorative particles R out of contact with the foam layer 12, the thermal fusion is not allowed to be effectively used for fixing the decorative particles R. In such a case, the decorative particles R may be fixed with an adhesive material or the like as described later, or a thermoplastic resin layer may be provided on the foaming inhibition ink, and the thermoplastic resin layer and the decorative particles R may be thermally fused.

Modified Example 2

The foam layer 12 may be a foam layer for using chemical foaming that has a thermoplastic resin as a base and contains a chemical foaming agent that generates a gas by thermal decomposition or the like with heating and a foaming auxiliary that promotes the foaming of the chemical foaming agent and decreases the foaming start temperature. As the chemical blowing agent, azodicarbonamide or the like is desirable. As the foaming auxiliary, zinc oxide or the like is desirable. In this case, the foaming inhibition ink is applied (printed) to a region that is not desired to be foamed (in the foregoing, the recesses 12E and 12F) by an inkjet printer or the like. As the foaming inhibition ink in this case, an ink that penetrates into the foam layer 12 and chemically inhibits foaming is employed. For example, the foaming inhibition ink contains a chemical foaming inhibitor including a benzotriazole-based compound such as 1,2,3-benzotriazole, 1-[N,N-bis(2-ethylhexyl)aminomethyl]benzotriazole, and 1-[N,N-bis(2-ethylhexyl)aminomethyl]methylbenzotriazole. It is to be noted that the foaming inhibition ink may at least partially fail to penetrate into the foam layer 12, and in such a case, as in Modified Example 1, the decorative particles R may be fixed with an adhesive material or the like as described later, or a thermoplastic resin layer may be provided on the foaming inhibition ink, and the thermoplastic resin layer and the decorative particles R may be thermally fused.

Modified Example 3

In addition, the foam layer 12 may optionally further contain a plasticizer, a filler, a pigment, a flame retardant, and the like, depending on the intended purpose. Examples of the plasticizer include bis(2-ethylhexyl) phthalate, diisononyl phthalate (DINP), diisodecyl phthalate (DIDP), di-2ethylhexyl adipate (DOA), diisononyl adipate (DINA), tri-2ethylhexyl trimellitate (TOTM), and tricresyl phosphate (TCP). Examples of the filler include calcium carbonate, talc, and clay minerals. Examples of the pigment include an arbitrary pigment (a pigment of an arbitrary color that colors the foam layer 12), for example, a white pigment such as titanium oxide. Examples of the flame retardant include a phosphoric acid-based flame retardant, a phosphoric acid ester-based flame retardant, an aluminum hydroxide-based flame retardant, a magnesium hydroxide-based flame retardant, and a chlorine-based flame retardant.

Modified Example 4

The decorative particles R are not limited to resin particles such as resin beads, and various particles can be employed. As the decorative particles R, particles made of glass such as glass beads, particles of natural mica or artificial mica, particles obtained by pulverizing seashells, particles of luminous materials, particles of lame, pearls, and the like can be employed. The decorative particles R may be colorless or colored and transparent, or may be non-transparent with a predetermined color. The decorative parts 15A and 15B may be composed of multiple types of decorative particles R. The decorative particle R may be, for example, 0.01 mm or more. The decorative particles R may have a size that is not allowed to be ejected by an inkjet printer (inkjet method) (thus, decorations that are not allowed to be expressed by inkjet can be achieved), and in this case, the decorative particles R may be supplied to the foam medium 10 by a dispenser, hand work, or the like as mentioned above. The decorative parts 15A and 15B have only to express, for example, the texture, material feeling, luster, gloss, metallic feeling, or the like unique to the plurality of decorative particles R (the decorative particles R are formed to have a size capable of these expressions). Accordingly, a high level of design can be achieved.

In a case where the decorative particles R are not made of a thermoplastic resin, the decorative particles R are bonded to the foam layer 12 by thermal fusion achieved by softening the thermoplastic resin of the foam layer 12. In this case, the decorative particles R out of contact with the thermoplastic resin (for example, the decorative particle R placed on another decorative particle R) are not fixed, and thus, for example, after the above-mentioned the second heat treatment (step S6), the unfixed decorative particles R may be blown off with air or the like and removed by suction or the like.

In a case where the decorative particles R are not made of a thermoplastic resin, each one of the decorative particles R that are not made of a thermoplastic resin may be coated with a thermoplastic resin in the second heat treatment such that the decorative particles R are thermally fused to each other, and furthermore, such that the decorative particles R and the foam layer 12 are more likely to be thermally fused to each other.

Modified Example 5

As shown in FIG. 9, the foam medium 10 may include an ink receiving layer 17 that prevents smearing of the foaming control ink or the color ink on the entire surface of the foam layer 12. For example, a void-type ink receiving layer including inorganic fine particles and a binder (base) that binds the inorganic fine particles can be employed as the ink receiving layer 17. In FIG. 9, the foam layer 12 according to Modified Example 2 is employed, and the foaming control ink (foaming inhibition ink) is kept penetrating in the foam layer 12 (that is, no foaming control ink layer is formed). In FIG. 9, the color ink is kept penetrating the ink receiving layer 17, and the color ink layer 13A and the like are formed in the ink receiving layer 17. The binder (base) of the ink receiving layer 17 is a thermoplastic resin such that the binder is allowed to be thermally fused to the decorative particles R. In FIG. 9, the decorative particles R are thermally fused to the ink receiving layer 17 to form the decorative part 15A and the like. The decorative particles R are fixed with the ink receiving layer 17, thereby eliminating the need for an adhesive material or the like for fixing the decorative particles R.

Modified Example 6

The decorative particles R may be fixed to the foam medium 10Q after the foaming with an adhesive or the like. In this case, the need for the second heat treatment is eliminated. Furthermore, there is also no need to employ any thermoplastic resin in the ink receiving layer 17 and the like.

As the adhesive, a curable resin such as a radiation curable resin or a thermosetting resin may be employed. For example, a curable resin before curing, with the decorative particles R dispersed, is applied to the foam medium 10Q, and then, the foam medium 10Q is irradiated with radiation (ultraviolet, electron beams, or the like) or heat to cure the curable resin. Thus, the curable resin is fixed to the foam medium 10Q, and the decorative particles R dispersed in the curable resin are also fixed to the foam medium 10Q. In addition, the decorative particles R may be fixed by thermal fusion after applying the curable resin to the entire surface of the foam medium 10Q or a region where the decorative part 15A and the like are provided and curing the curable resin (in the case of the entire surface, the color ink layer 14A and the like are covered with the cured resin layer). In this case, the curable resin preferably has thermoplasticity. It is to be noted that instead of the curable resin, a predetermined thermoplastic resin layer may be provided and then used for fixing the decorative particles R.

Modified Example 7

As illustrated in FIG. 10, a decorative part 16A or the like may be provided instead of the decorative part 15A or the like. The decorative part 16A or the like include a plurality (large number) of decorative particles R with which the recess 12E is filled.

In (A) of FIG. 10, the decorative particles R in the recess 12E are sealed (fixed) with a sealing material such as a transparent film F attached to the surface of the foam medium 10R in which the recess 12E is filled with the plurality (large number) of decorative particles R.

In (B) of FIG. 10, a transparent layer (fixed to the foam medium 10Q) 18A formed from an adhesive, various resins, and the like is provided in the recess 12E, and the decorative particles R are fixed by disposing the decorative particles R in the transparent layer 18A. For example, after supplying the decorative particles R into the recess 12E, the above-mentioned curable resin or the like is poured into the recess 12E and cured to form the transparent layer 18A.

In (C) of FIG. 10, a transparent layer (fixed to the foam medium 10Q) 19 formed from an adhesive, various resins, and the like is formed from the protrusions 12A and 12B to the recess 12E. The transparent layer 19 is fixed by fusion bonding or the like to the protrusion S1 including the protrusion 12A and the color ink layer 14A, the protrusion S2 including the protrusion 12B and the color ink layer 14B, and the recess 12E. The decorative particles R are fixed by disposing the decorative particles R in a part 19A of the transparent layer 19 in the recess 12E. A plurality of decorative particles M that are different from the decorative particles R are disposed in parts 19B and 19C of the transparent layer 19 over the protrusions 12A and 12B, thereby fixing the plurality of decorative particles M. A decorative part (a decorative part that is different from the decorative part 16A) is formed by the plurality of decorative particles M (the description thereof conforms to that of the decorative particles R). For example, after supplying the decorative particles R into the recess 12E, the above-mentioned curable resin or the like is poured into the recess 12E and overflowed to reach the protrusion S1 or the like, thereafter, the second decorative particles M (the size and the like conform to those of the decorative particles R) are applied into the resin on the protrusion S1, and thereafter, the curable resin or the like is cured to form the transparent layer 19.

With the decorative part 16A as shown in FIG. 10, the aggregation of a large number of decorative particles R is visually recognized, a unique appearance is expressed by the aggregation of the large number of decorative particles R, thereby achieving a high level of design. Furthermore, as shown in (C) of FIG. 10, the transparent layer 19 is formed and then fixed over the protrusion S1 and the like and the recess 12E, thereby increasing the adhesive area between the transparent layer 19 and the foam medium 10Q, and allowing disadvantages such as peeling of the transparent layer 19 to be prevented.

Modified Example 8

A protective layer (for example, a transparent resin layer) for protecting the color ink layer 14A, the decorative part 15A, and the like may be provided after fixing the decorative particles R. The protective layer may be provided over the entire surface of the foamed product 1, or may be provided only (that is, partially on the surface) on what is desired to be protected (for example, only the color ink layer).

Modified Example 9

The elements (protrusions, recesses, decorative parts, and the like) described above have arbitrary shapes. The images may be printed on the protrusions 12A to 12C, or may be formed over the protrusions and the recesses. In particular, an image may be printed in a recess provided with a decorative part so as to constitute a base for the decorative part. The amount of the foaming control ink applied may be varied depending on the location of the application, thereby forming protrusions that differ in the degree of foaming (height). The decorative part may be provided on, of a certain protrusion and a part with a lower degree of foaming (including non-foaming) than the protrusion, only the latter. The decorative part may be formed on the inner wall surface of a recess in addition to the bottom surface of the recess.

Modified Example 10

The present invention can be applied to wallpaper and the like, and may also be applied to various objects to be decorated, such as stickers to be attached to smartphone cases, novelty goods (in particular, personal goods), and the like, and the structures of the cases and goods themselves, and the like.

A foaming apparatus 100 for a foamable medium 110 according to an embodiment of the present invention will be described with reference to the drawings.
(Configuration of Foamable Medium 110)

The foamable medium 110 is a medium in the form of a sheet (arbitrary in thickness, including a film as a thin sheet), and can be taken up in the form of a roll for storage and transportation. As shown in FIG. 1, the foamable medium 110 includes a base material 111 and a foam layer 112 formed on one surface of the base material 111.

The base material 111 is a sheet made of an arbitrary material. Examples of the material for the base material 111 include paper, fabrics, and plastic. The base material 111 is preferably high in, in particular, water resistance and adhesion to the foam layer 112 described later. Examples of such a base material 111 include a nonwoven fabric sheet, a fleece sheet, and a porous film.

The foam layer 112 is a thermoplastic resin layer that expands when the foaming component in the layer is heated and thereby foamed and increases in thickness before the foaming. In this specification, such expansion of the foam layer 112 by heating is also referred to as "foaming" of the foam layer 112. In addition, the temperature at which the foaming component is foamed is also referred to as a foaming temperature. In particular, the foaming temperature encompasses a foaming start temperature at which the foaming component starts to foam.

The foaming by heating has an arbitrary principle, and for example, thermoplastic resin microcapsules enclosing a chemical foaming agent that generates a gas with heating such as thermal decomposition or a volatile solvent that is volatilized and expanded by heating can be used as the foaming component.

Examples of the chemical foaming agent described previously include azodicarbonamide, N,N'-dinitrosopentamethylenetetramine, 4,4'-oxybis(benzenesulfonylhydrazide), and sodium hydrogen carbonate, and in particular, azodicarbonamide is desirable.

Examples of the microcapsules described previously include thermoplastic resin microcapsules enclosing a volatile organic solvent. Examples of the volatile organic solvent include petroleum ethers, hydrocarbons (such as isobutane, pentane, hexane, and heptane), low-boiling-point halogenated hydrocarbons, and methylsilane. Examples of the thermoplastic resin constituting the microcapsules include a vinylidene chloride-acrylonitrile-based copolymer, an acrylonitrile-based copolymer, an acrylic acid ester-based copolymer, and a methacrylic acid ester-based copolymer.

The thermoplastic resin to serve as a main component of the foam layer 112 is arbitrary as long as the resin conforms to the foaming principle of the foaming component and expands by foaming of the foaming component. Examples of the thermoplastic resin include a polyvinyl chloride resin, a polyethylene resin, a polypropylene resin, a polyethylene-vinyl acetate copolymer (EVA), an acrylic resin, and a urethane resin. Furthermore, the polyvinyl chloride resin preferably has, as a base resin, a soft polyvinyl chloride with a plasticizer described later used in combination.

The foam layer 112 may further include additional components, depending on the foam component. For example, in the case of using a chemical foaming agent as the foaming component, a foaming auxiliary agent that promotes the foaming of the chemical foaming agent and lowers the foaming temperature is preferably further blended into the thermoplastic resin. Examples of such a foaming auxiliary include zinc compounds such as a zinc stearate and barium compounds such as a barium stearate.

The foam layer 112 may optionally further include plasticizers, fillers, pigments, flame retardants, and the like, depending on the intended purpose.

Examples of the plasticizer include bis(2-ethylhexyl) phthalate, diisononyl phthalate (DINP), diisodecyl phthalate (DIDP), di-2-ethylhexyl adipate (DOA), diisononyl adipate (DINA), tri-2-ethylhexyl trimellitate (TOTM), and tricresyl phosphate (TCP).

Examples of the filler include calcium carbonate, talc, and clay minerals.

Examples of the pigment include any pigment, for example, white pigments such as titanium oxide.

Examples of the flame retardant include a phosphoric acid-based flame retardant, a phosphoric acid ester-based flame retardant, an aluminum hydroxide-based flame retardant, a magnesium hydroxide-based flame retardant, and a chlorine-based flame retardant.

The foamable medium 110 may further have, as shown in (a) of FIG. 11, a foaming promotion layer 113, a foaming inhibition layer 114, and/or an image layer 115 formed in advance on the foam layer 112, depending on desired designs.

The foaming promotion layer 113 is a layer containing a foaming promotor that promotes the foaming of the foam layer 112 by heating. Thus, in a case where the foamable medium 110 is heated by the foaming apparatus 100 described later to form the foamable medium 110 with the foam layer 112 foamed, the protrusion of the region with the foaming promotion layer 113 provided in the foam layer 112 is higher than the region without the foaming promotion layer 113 provided therein, as shown in (b) of FIG. 11. As a result, a protrusion 113a that has the shape of the foaming promotion layer 113 in planar view is formed for the foamable medium 110 foamed.

The foaming promotor is optional as long as the foaming of the foam layer 112 can be promoted at a heating temperature for a second heater 170 described later. The principle for the foaming promotor promoting the foaming of the foaming component is not particularly limited, and for example, an agent that chemically promotes a chemical reaction required for the foaming of the foaming component (chemical foaming promotor) or a heat absorbing agent that locally increases the temperature of an application site can be used as the foaming promotor. For example, in the case of using the above-described chemical foaming agent as the foaming component, a chemical foaming accelerator such as a urea compound (e.g., urea) or a zinc compound can be used as the foaming promotor. Alternatively, in the case of using the above-described microcapsules as the foaming component, a heat absorbing agent such as carbon black can be used as the foaming promotor.

The foaming inhibition layer 114 is a layer containing a foaming inhibitor that inhibits the foaming of the foam layer 112 by heating. Thus, in a case where the foamable medium 110 is heated by the foaming apparatus 100 described later to foam the foamable medium 110, the protrusion of the region with the foaming inhibition layer 114 provided in the foam layer 112 is lower than the region without the foaming inhibition layer 114 provided therein, or the region with the foaming inhibition layer 114 provided in the foam layer 112 is not protruded at all, as shown in (b) of FIG. 11. As a result, a recess 114a that has the shape of the foaming inhibition layer 114 in planar view is formed for the foamable medium 110 foamed.

The foaming inhibitor is optional as long as the foaming of the foam layer 112 can be inhibited at a temperature at which the foam layer 112 is foamed by heating. The principle of the foaming inhibitor inhibiting the foaming of the foaming component is not particularly limited, and for example, an agent that chemically inhibits a chemical reaction required for the foaming of the foaming component (chemical foaming inhibitor), a heat dissipating agent that locally lowers the temperature of the application site, a decomposer that chemically or physically decomposes the foaming component, or the like can be used as the foaming inhibitor. For example, in the case of using the above-described chemical foaming agent as the foaming component, chemical foaming inhibitors including benzotriazole-based compounds such as 1,2,3-benzotriazole, 1-[N,N-bis(2-ethylhexyl)aminomethyl]benzotriazole, 1-[N,N-bis(2-ethylhexyl)aminomethyl]methylbenzotriazole, and 2,2'-[[(methyl-1H-benzotriazole-1-yl)methyl]imino]bisethanol can be used as the foaming inhibitor. Alternatively, in the case of using the above-described microcapsules as the foaming component, decomposers such as acetone, methyl ethyl ketone, ethyl butyl ketone, methanol, ethanol, ethyl acetate, γ-butyrolactone, ε-caprolactone, and dimethylformamide can be used as the foaming inhibitor. The foaming inhibitor is preferably not decomposed or evaporated during heating of the foamable medium 110. The heat resisting temperature of the foaming inhibitor is desirably 210° C. or higher in measurement with a thermogravimetric differential thermal analyzer (TG-DTA).

The image layer 115 is an ink layer that constitutes an image formed on the surface of the foamable medium 110. The image layer 115 is printed by an inkjet method with the use of, for example, each ink of YMCK (an aqueous ink that has a pigment dispersed in water, a solvent pigment ink that has a pigment dispersed in an organic solvent, an aqueous dyed ink that has a dye dissolved in water, a solvent dyed ink that has a dye dissolved in an organic solvent, or the like) by an inkjet printer. The image layer 115 may be printed by offset printing, gravure printing, screen printing, or the like.

The image layer 115 may be formed directly on the foam layer 112, the foaming promotion layer 113, and/or the foaming inhibition layer 114, for example, as shown in (a) and (b) of FIG. 1. After an undercoat layer made of a white ink or the like is formed on the foam layer 112, the foaming promotion layer 113, and/or the foaming inhibition layer 114, the image layer 115 may be formed on the undercoat layer.

The image layer 115 may be formed over the foam layer 112 and over the foaming promotion layer 113 or the foaming inhibition layer 114. In this case, as shown in (b) of FIG. 11, the paint for the image layer 115 may be a paint that provides the image layer 115 with breaking strength to the extent that a deformation is caused to follow the shape of the protrusion 113a or recess 114a formed with the foaming promotion layer 113 or the foaming inhibition layer 114 on the foamed foamable medium 110. Furthermore, the ink for the image layer 115 may be an ink that provides the image layer 115 with breaking strength to the extent of breaking at the boundary between the protrusion 113a or the recess 114a and the periphery depending on desired designs.

(Configuration of Foaming Apparatus 100)

As shown in FIG. 12, the foaming apparatus 100 includes a conveying apparatus 130, a first heater 150, and a second heater 170.

The conveying apparatus 130 transports the foamable medium 110 into the heating region heated by the first heater 150 and the second heater 170, and transports the foamed foamable medium 110 heated and foamed by the second heater 170 out of the heating region as described later. The conveying apparatus 130 includes a feed roller 131 that feeds a sheet of the foamable medium 110 from a roll of the foamable medium 110, one or more (for example, three in the figure) guide rollers 132 that appropriately turn around the fed foamable medium 110 and convey the medium through the heating region, and a winding roller 133 that winds up the sheet of the foamed foamable medium 110 conveyed by the guide roller 132 into a roll shape.

When the foamable medium 110 is compressed from the foam layer 112 between leaving the heating region and being cooled, the foam layer 112 compressed is solidified, thus suppressing expansion of the foam layer 112. Furthermore, even if the foamable medium 110 is compressed from the foam layer 112 while being heated in the heating region, expansion of the foam layer 112 is similarly suppressed. Thus, the conveying apparatus 130 (for example, guide roller 132) is preferably configured not to compress the foamable medium 110 from the foam layer 112 (in particular, so as to keep the conveying apparatus 130 from coming into contact with the foam layer 112) before being cooled down to a temperature at which the foamable medium 110 is not irreversibly deformed during heating and after expansion by heating (in particular, while heating of the foamable medium 110 by the second heater 170).

The first heater 150 heats the foamable medium 110 at a first temperature (for example, a temperature within the range of 40 to 70° C. or the like) that is higher than the environmental temperature (in particular, higher than room temperature (25° C.)) and lower than the foaming temperature (in particular, lower than the foaming start temperature). For example, the first heater 150 may heat the foamable medium 110 to a temperature close to the foaming temperature.

The first heater 150 includes a platen heater 151 and a press roller 152.

The platen heater 151 is composed of a platen on which the foamable medium 110 slides, and a heater that is disposed on the back surface of the platen to heat the platen and the foamable medium 110 thereon.

The press roller 152 is a roller that prevents the foamable medium 110 on the platen of the platen heater 151 from floating from the platen during the movement of the foamable medium 110, so as not to lose the contact between the platen heater 151 and the foamable medium 110.

The second heater 170 heats the foamable medium 110 at a second temperature that is equal to or higher than the foaming temperature (in particular, equal to or higher than the foaming start temperature) to foam the foamable medium 110.

The second heater 170 includes a heating device 171 and an up-down moving mechanism 172.

The heating device 171 is a non-contact-type heating device disposed so as to face the foam layer 112 of the foamable medium 110 conveyed by the conveying apparatus 130, for heating the foamable medium 110 from the foam layer 112 so as to keep the heating site from coming into contact with the surface (in particular, the foam layer 112) of the foamable medium 110. Examples of the non-contact-type heating device include a radiation-type heating device (for example, an infrared heating device such as an infrared heater), a microwave heating device, a heating-wire heater, and a hot-air dryer. In particular, a far infrared heater is preferred as the non-contact-type heating device, and examples thereof include a ceramic heater, a carbon black heater, and a quartz heater.

The up-down moving mechanism 172 moves the heating device 171 up and down in a direction perpendicular to the surface of the underlying foamable medium 110. The up-down moving mechanism 172 includes, for example, a threaded guide rod extending in the perpendicular direction described previously, an up-down plate screwed with the guide rod to movably hold the heating device 171, and a motor that moves the up-down plate up and down by rotating the guide rod forward and backward.

The second temperature is controlled by adjusting the output of the heating device 171 and/or the distance between the heating device 171 and the foamable medium 110.

The second heater 170 is disposed close to the first heater 150 so as to keep the foamable medium 110 heated by the first heater 150 from cooling down.

In particular, the second heater 170 preferably heats the foamable medium 110 with a uniform heating temperature distribution in the conveyance direction. For example, the second heater 170 may include a plurality of heating devices 171 arranged in the conveyance direction of the foamable medium 110, and the respective heating devices 171 may have the same heating temperature. The foamable medium 110 is heated in accordance with a uniform heating temperature distribution at temperatures that are equal to or higher than the foaming temperature from the inlet side to the outlet side, thereby allowing the foaming time to be shortened as compared with a case of heating in accordance with a heating temperature distribution that has a region of heating at a temperature that is lower than the foaming temperature anywhere from the inlet side to the outlet side (for example, a heating temperature distribution in which the heating temperature increases from the inlet side toward the outlet side and reaches the foaming temperature or higher in the middle).

As described above, the foamable medium 110 is foamed, thereby forming a foam with a desired irregularity pattern and image, for example, as shown in (b) of FIG. 11.

Effects of Present Embodiment

In a conventional foaming apparatus for a foamable medium, if the heating temperature of the foaming apparatus is increased for shortening the foaming time taken to foam the foamable medium (for example, the furnace length of the heating region for foaming is shortened and/or the conveyance speed of the foamable medium is increased), the foamable medium is likely to be damaged by heat, and if the foaming time is excessively shortened for reducing the thermal damage, then insufficient foaming can be obtained. Thus, when the heating temperature is increased, it is difficult to adjust the foaming time (in particular, to adjust the furnace length of the heating zone for foaming and/or adjust the conveyance speed of the foamable medium).

In contrast, in the foaming apparatus 100 for the foamable medium 110 according to the present embodiment, before the foamable medium 110 is foamed by the second heater 170, the foamable medium 110 is heated by the first heater 150 in advance at a temperature that is lower than the foaming temperature. The conventional foaming apparatus is required to heat the foamable medium from normal temperature until reaching the foaming temperature, whereas the foaming apparatus 100 according to the present embodiment has only to heat the foamable medium 110 from a temperature that is equal to or higher than normal temperature (for example, a temperature close to the foaming temperature) until reaching the foaming temperature. For this reason, the foaming apparatus 100 according to the present embodiment is, as compared with the conventional foaming apparatus, capable of slowing down the heating rate for foaming, that is, capable of lowering the heating temperature for foaming, thus making it easy to adjust the foaming time.

In addition, in the present foaming apparatus 100, it is easy to adjust the foaming time, in particular, adjust the conveyance speed of the foamable medium 110, thus allowing the furnace length of the heating region heated by the second heater 170 to be shortened.

In addition, the fact that it is easy to adjust the foaming time means that the control of the heating temperature for foaming also has a margin when the foaming time is considered to be fixed, thus making it also possible for the heating temperature of the second heater 170 to be adjusted by adjusting the position of the heating device 171 with the up-down moving mechanism 172 with which fine temperature control is relatively difficult. This is advantageous in that the size of the foaming apparatus 100 in the conveyance direction can be reduced, because the heating temperature of the second heater 170 can be controlled with the distance in the vertical direction (the length perpendicular to the conveyance direction) between the heating device 171 of the second heater 170 and the foamable medium, rather than the furnace length (the length in the conveyance direction) of the heating region of the second heater 170.

Moreover, in the conventional foaming apparatus, when the heating temperature of the foaming apparatus is increased for reducing the foaming of the foamable medium, uneven foaming is caused in the same foamable medium or between different foamable media. This is believed to be because only a part of the foamable medium is cooled with vaporization of the component of the coloring ink or foaming inhibition ink printed on the foamable medium, or the temperature of the place where the foamable medium is stored is originally non-uniform, thereby resulting in non-uniformity in the temperature of the foamable medium before foaming. In the present foaming apparatus, uniform heating by the platen heater 151 of the first heater 150 eliminates temperature non-uniformity in the same foamable medium 110 or between different foamable media 110 before heating by the second heater 170, thus causing no uneven foaming in the same foamable medium 110 or between different foamable media 110.

Modified Example 11

The first temperature is adjusted to be lower than the foaming temperature in the embodiment mentioned above, but instead, the first temperature may be adjusted to be lower than the melting temperature of the thermoplastic resin constituting the foam layer. If the thermoplastic resin constituting the foam layer of the foamable medium 110 is melted by heating with the first heater 150, the components in the foam layer 112 will be biased with the deposition of a component (for example, a filler or the like) that is heavier (higher in density) than the thermoplastic resin, and thus, foaming by heating with the second heater 170 may cause the foamable medium 110 to foam unevenly as a reflection of the bias. Even when the first temperature is lower than the foaming temperature, this problem is not caused as long as the heating time is short, but when the first temperature is lower than the melting temperature of the thermoplastic resin, this problem can be avoided without the need for the control of the heating time.

Modified Example 12

The first temperature is adjusted to be lower than the foaming temperature in the embodiment mentioned above, but instead, the first temperature may be adjusted to be lower than the glass transition temperature of the thermoplastic resin constituting the foam layer 112. When the thermoplastic resin constituting the foam layer 112 of the foamable medium 110 is heated to a temperature that is equal to or higher than the glass transition point, and then softened, components that are heavier (higher in density) than the resin may be biased downward in the softened resin, as in Modified Example 1. As in Modified Example 1, this problem can be avoided by adjusting the first temperature to be lower than the glass transition point of the thermoplastic resin.

Modified Example 13

The foamable medium 110 is used in the embodiment mentioned above, but the medium to be foamed by the foaming apparatus 100 is not limited thereto, and any foamable medium including the foam layer 112 may be employed. For example, on the surface of the foam layer 112, a protective layer may be formed by liquid lamination or the like.

Modified Example 14

In the embodiment mentioned above, the second heater 170 may further include a housing that covers the heating device 171 and the heated part of the foamable medium 110 for preventing heat dissipation to the outside of the second heater 170 and thereby enhancing the heating efficiency. In addition, the second heater 170 may further include a ventilator for discharging gases (in particular, toxic gases) generated from the foamable medium 110 by heating.

Modified Example 15

In the embodiment mentioned above, a contact-type heating device other than the platen heater may be used as the first heater 150. Examples of such a contact-type heating device include a rubber roll heater with a sheath heater built therein, and a heater block with a cartridge heater built therein. In general, the contact-type heating device is capable of uniformly heating a target object with less temperature non-uniformity, as compared with the non-contact-type heating device. Thud, the employment of a contact-type heating device as the first heater 150 can eliminate temperature non-uniformity in the same foamable medium 110 or between different foamable media 110 before heating with the second heater 170.

Modified Example 16

In the embodiment mentioned above, a non-contact-type heating device may be used as the first heater 150. Examples of such a non-contact-type heating device include a ceramic heater, a far infrared heater, a halogen heater, and a hot-air generator. In particular, a fan heater that is capable of uniformly heating a target object to the same extent as the contact-type heating device is preferably used as the non-contact-type heating device. Even with such a configuration, temperature non-uniformity in the same foamable medium 110 or between different foamable media 110 can be eliminated before heating with the second heater 170. In addition, inn this modified example, the first heater 150 may be provided with a housing or a ventilator as in Modified Example 4.

Modified Example 17

In the embodiment mentioned above, the heating rate is controlled by adjusting the heating temperature with the up-down moving mechanism 172 in the second heater 170, but instead of or in addition to this control, the heating rate may be controlled by adjusting the length of the region heated by the second heater 170 in the conveyance direction.

Modified Example 18

In the embodiment mentioned above, the first heater 150 preferably heats the foamable medium 110 such that the foamable medium 110 has a predetermined temperature in feeding to the second heater 170. In accordance with such a configuration, the temperature of each foamable medium 110 is a constant temperature at the start of heating the foamable medium 110 with the second heater 170, regardless of the original temperature of the foamable medium 110 before feeding to the foaming apparatus 100, thus uniformizing the degree of foaming of each foamable medium 110 by heating with the second heater 170. In particular, when the temperatures of the foamable mediums 110 to be fed to the second heater 170 vary even under the same heating conditions (heating temperature, heating time, and the like) of the second heater 170, the foamable mediums 110 vary in the degree of foaming, and thus, the present modified example is suitable in the case of controlling the degree of foaming of each foamable medium 110 with the second heater 170 to keep the degree constant.

The features described in the above-described embodiments and modified examples can be arbitrarily combined as long as there is no contradiction.

The invention claimed is:

1. A foamed product, comprising:
   a foam medium, having a foam layer, and the foam medium including: a first part that is a protrusion protruded by foaming, and a second part that is a recess being lower than the first part; and
   a decorative part, having a plurality of decorative particles provided on a surface of the foam layer, and the decorative part being formed only in the second part, wherein
   a foaming control ink layer and a color ink layer are provided on the first part,
   the foam layer has a thermoplastic resin, and the plurality of decorative particles is fused in the second part,
   a glass transition point of the thermoplastic resin is lower than a foaming start temperature of the foam layer.

2. The foamed product as set forth in claim 1, wherein the plurality of decorative particles is 0.01 mm or more in height or width.

3. The foamed product as set forth in claim 1, wherein the plurality of decorative particles each have a size that is visually recognizable with naked eyes.

4. The foamed product as set forth in claim 1, wherein the foam medium has an image printed thereon.

5. The foamed product as set forth in claim 1, wherein the foam medium includes:
   a foamed part, including the first part; and
   a less foamed part, including the second part, and the less foamed part being less foamed than the foamed part,
   wherein the decorative part is formed only in at least a part of the less foamed part.

6. The foamed product as set forth in claim 1, wherein the second part is a recess, and
   the recess is filled with the plurality of decorative particles.

7. The foamed product as set forth in claim 1, wherein the foam medium has the thermoplastic resin constituting the foam layer or an ink receiving layer, and
   the plurality of decorative particles is fused to the thermoplastic resin.

8. The foamed product as set forth in claim 1, further comprising:
   a transparent layer, formed over the first part and the second part, and fixed to the first part and the second part,
   wherein the plurality of decorative particles is disposed in a part of the transparent layer corresponding to the second part.

9. A manufacturing method for the foamed product according to claim 1 including a foam medium having a foam layer, comprising:
   a first step of heating the foam layer at a first temperature and foaming the foam layer to form, in the foam layer, the first part that is a protrusion protruded by the foaming and the second part that is a recess being lower than the first part; and a second step of fixing the plurality of decorative particles only to the second part, wherein the second step comprises:
- a step 2-1 of supplying the plurality of decorative particles to at least the second part of the foam layer;
- a step 2-2 of scraping off, among the plurality of decorative particles supplied in the step 2-1, the decorative particles remaining on the first part of the foam layer to the second part; and
- a step of 2-3 of heating the foam layer obtained by the step 2-2 at a second temperature that is lower than the foaming start temperature of the foam layer to fuse the plurality of decorative particles to a surface of the foam layer.

* * * * *